UNITED STATES PATENT OFFICE.

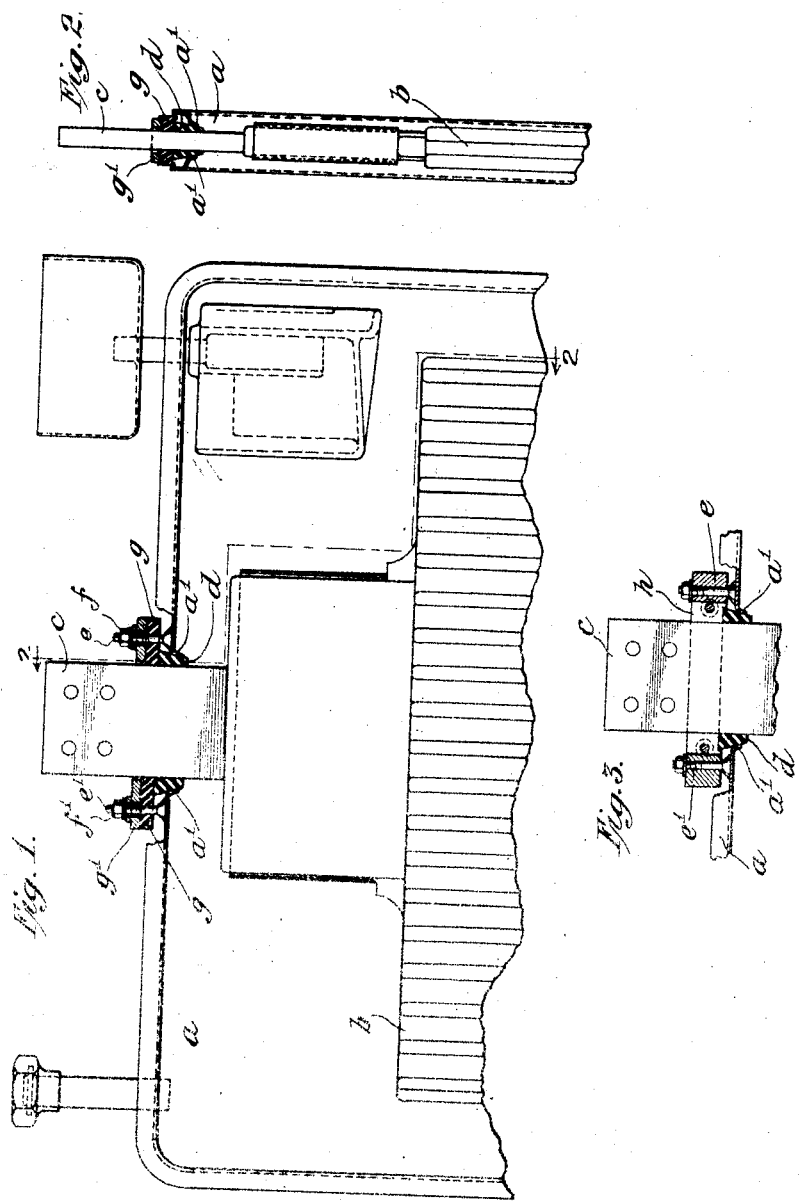

ISAAC H. LEVIN, OF NEW YORK, N. Y.

ELECTROLYTIC CELL.

1,360,544.  Specification of Letters Patent.  Patented Nov. 30, 1920.

Application filed April 21, 1919, Serial No. 291,645. Renewed April 23, 1920. Serial No. 376,170.

*To all whom it may concern:*

Be it known that I, ISAAC H. LEVIN, a citizen of the United States, residing at the borough of Manhattan, in the city, county, and State of New York, have invented certain new and useful Improvements in Electrolytic Cells, of which the following is a specification, reference being had therein to the accompanying drawings, which form a part thereof.

My invention relates to electrolytic cells and more particularly to the details of construction by means of which a gas-tight insulating support is afforded the terminals of the electrodes.

Heretofore in cells of the type to which my invention relates, one end of the electrode is passed through an opening in resilient packing secured between clamp plates drawn together by means of screw bolts. To prevent current entering the casing of the electrode, it was necessary to provide insulating nipples for the screw bolts, and the construction was such as to entail considerable difficulty in the assembling of the cell and in securing the proper insulation.

In a cell made in accordance with my invention, I provide an insulating body inclosing the terminal and co-acting with beveled walls of an opening in the casing, so that pressure applied to said body in one direction only will, as a result of a wedging action, compress the insulating material and cause it to conform to the walls of the opening in the casing, and to the surface of the terminal of the electrode in a manner to secure the desired gas-tight joint at this point. By this construction the entire mechanism for securing the joint may be carried on the exterior of the cell, and the means for developing pressure upon the insulation may be utilized for preventing an electrical connection being formed between the terminal and the casing of the cell.

With this construction, a narrow terminal of the same cross section throughout may be employed, thus avoiding any necessity for providing any projections upon the terminal or any mechanism within the cell casing.

The manner of forming a gas-tight insulating joint between the electrode and the casing is especially adapted for use in cells employing narrow terminal bars.

The invention consists primarily in an electrolytic cell embodying therein a cell casing having an opening therein, the walls of which converge inwardly of the cell, a tapered resilient body of insulating material having an opening therein through which the electrode terminal may pass, studs carried by said casing adjacent said opening, a member embodying therein insulating material, movably mounted upon said studs, and means coöperating with said studs and forcing said member and said body of insulating material within the opening in said cell casing, whereby the resultant wedging of said material in said opening will cause said material to be forced intimately into contact with said terminal and the walls of said openings; and in such other novel features of construction and combination of parts as are hereinafter set forth and described, and more particularly pointed out in the claims hereto appended.

Referring to the drawings,

Figure 1 is a sectional view of a cell embodying my invention;

Fig. 2 is a section on the line 2—2 of Fig. 1; and

Fig. 3 is a sectional view of another embodiment of the packing means of the invention.

Like letters refer to like parts throughout the several views.

In the embodiment of my invention shown in the drawings, it is illustrated in connection with a cell having a sheet metal casing $a$ through the top of which is formed an opening, the material of the casing about said opening being formed downwardly as shown at $a'$, to provide, about said opening, walls having sufficient area to permit the formation of a gas-tight joint at this point. This opening is substantially rectangular, the opposite inwardly drawn walls converging slightly toward the interior of the cell. In the drawings, but a single electrode $b$ is shown which electrode has a terminal $c$ projecting through the opening in the casing $a$.

Inclosing the terminal $c$ is an insulating body $d$ composed of soft rubber or other suitable resilient material, the outer face of which is tapered as shown, so as to conform more or less to the walls $a'$ of said opening. By this construction, if the packing body $d$ be forced within the opening, it will be compressed sufficiently to not only form a gas-tight joint with the walls $a'$, but also with the walls of the terminal $c$.

Carried by the casing $a$ are screw-threaded studs $e-e'$ extending parallel with the terminal $c$, said studs being secured to the casing $a$ by being welded thereto, thus avoiding any necessity for perforating the casing and avoiding possibility of a gas leak about these studs. I preferably employ this means of uniting the studs with the casing as it reduces the number of insulating gas-tight joints which must be made in a cell.

Coöperating with the studs $e-e'$ are nuts $f-f'$ which act upon a member interposed between same and the packing body $d$, which member is relied upon to effectively insulate said studs and hence the casing $a$ from the terminal $c$.

In Figs. 1 and 2 of the drawings, I have illustrated one form of this interposed member, and in Fig. 3 I have illustrated another form thereof. In the form shown in Figs. 1 and 2, this member embodies therein a plate $g$ of insulating material having a close sliding fit with the terminal $c$, said material preferably consisting of hard vulcanized rubber having secured thereto a wear ring $g'$ of metal of a width to space it away from the terminal $c$ to an extent to prevent electrical contact therewith. The nuts $f-f'$ bear upon the wear ring $g'$.

In the form of the invention shown in Fig. 3, this member is composed of a block of wood $h$ suitably coated with paraffin or other moisture resisting material, which has a sliding fit with the terminal $c$ and bears upon the packing body $d$ about said terminal. In this form of the invention the nuts $f-f'$ bear directly upon this wood block, the material of which block effectively insulates the studs $e-e'$ from the terminal $c$.

In a cell made in accordance with my invention, various electrodes may be assembled in the cell with the terminals thereof projecting through the openings in the cell casing. The casing parts may then be assembled and permanently united, it being possible, by the construction described, to thereafter effectively pack the terminal from the outside of the cell. This is done by merely slipping a body $d$ of the resilient material over the terminal $c$ thereafter mounting the thrust member $g$, $g'$ or $h$ upon the studs $e-e'$ and forcing this member toward the cell by means of the nuts $f-f'$. The member $d$ may thus be forced within the opening in the cell casing under conditions which, as a result of the compression of the material of the body $d$, will form a gas-tight joint about the walls $a'$ as well as about the terminal $c$. In the event of a loss of this joint from any reason whatever, additional pressure may be applied to the member $d$ to insure a higher degree of compression to correct this condition, or if desired, the old member $d$ may be removed and a new member $d$ quickly substituted therefor, without otherwise dismantling or interfering with other conditions about the cell, it being possible to temporarily cut out a cell for the purpose of effecting this repair.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. An electrolytic cell embodying therein a cell casing having an opening therein, the walls of which converge inwardly of the cell, a tapered resilient body of insulating material having an opening therein through which the electrode terminal may pass, studs carried by said casing adjacent said opening, a member embodying therein insulating material, movably mounted upon said studs, and means coöperating with said studs and forcing said member and said body of insulating material within the opening in said cell casing, whereby the resultant wedging of said material in said opening will cause said material to be forced intimately into contact with said terminal and the walls of said openings.

2. An electrolytic cell embodying therein a cell casing having an opening therein, the walls of which converge inwardly of the cell, a tapered resilient body of insulating material having an opening therein through which the electrode terminal may pass, screw-threaded studs permanently secured to the exterior of said casing adjacent said opening, a member embodying therein insulating material, movably mounted upon said studs inclosing said terminal, and acting upon said member, whereby said body of insulating material may be forced within said opening in said cell casing, the resultant wedging of said material in said opening causing said material to be forced intimately into contact with said terminal, and the walls of said opening.

3. An electrolytic cell embodying therein a cell casing having an opening therein, the walls of which converge inwardly of the cell, screw-threaded studs carried by said casing adjacent said opening, nuts mounted upon said studs, a tapered resilient body of insulating material having an opening therethrough through which the electrode terminal may pass, and adapted to enter said opening, and an interposed member between said nuts and said resilient body embodying therein insulating material engaging the electrode terminal, whereby said terminal is insulated from said studs and said nuts, said nuts through said interposed member, being adapted to force said body of insulating material in said opening with a resultant compression of said material between said opening and said terminal, whereby said material is forced intimately into contact with said terminal and the walls of said opening.

4. An electrolytic cell embodying therein a sheet metal cell casing having an opening therein, the material of said casing about said opening being so formed as to present converging walls about said opening, screw-threaded studs secured to said casing exteriorly thereof, a tapered body of resilient insulating material having an opening therein through which the electrode terminal may pass, nuts mounted upon said studs, and an interposed member between said nuts and said resilient body embodying therein insulating material engaging the electrode terminal, whereby said terminal is insulated from said studs and said nuts, said nuts through said interposed member, being adapted to force said body of insulating material in said opening with a resultant compression of said material between said opening and said terminal, whereby said material is forced intimately into contact with said terminal and the walls of said opening.

5. An electrolytic cell embodying therein a cell casing having an opening therein, the walls of which converge inwardly of the cell, a tapered resilient body of insulating material having an opening therein through which the electrode terminal may pass, studs carried by said casing adjacent said opening, a block of wood covered with moisture repellent material having a sliding fit with the terminal and adapted to bear upon said insulating material, and means coöperating with said studs and forcing said block and said body of insulating material within the opening in said cell casing, whereby the resultant wedging of said material in said opening will cause said material to be forced intimately into contact with said terminal and the walls of said openings.

In witness whereof I have hereunto affixed my signature, this 19th day of April, 1919, in the presence of two subscribing witnesses.

ISAAC H. LEVIN.

Witnesses:
F. T. WENTWORTH,
A. E. RENTON.